US011958419B2

(12) United States Patent
Yepez

(10) Patent No.: US 11,958,419 B2
(45) Date of Patent: Apr. 16, 2024

(54) COLLAPSIBLE VEHICLE CAMERA ARM ASSEMBLY

(71) Applicant: Stoneridge, Inc., Novi, MI (US)

(72) Inventor: Juan Pablo Yepez, Chihuahua (MX)

(73) Assignee: STONERIDGE, INC., Novi, MI (US)

( * ) Notice: Subject to any disclaimer, the term of this patent is extended or adjusted under 35 U.S.C. 154(b) by 0 days.

(21) Appl. No.: 17/679,868

(22) Filed: Feb. 24, 2022

(65) Prior Publication Data
US 2023/0264636 A1  Aug. 24, 2023

(51) Int. Cl.
B60R 11/04 (2006.01)
B60R 11/00 (2006.01)
G03B 17/56 (2021.01)

(52) U.S. Cl.
CPC ............ *B60R 11/04* (2013.01); *G03B 17/561* (2013.01); *B60R 2011/004* (2013.01)

(58) Field of Classification Search
CPC .. B60R 11/04; B60R 2011/004; G03B 17/561
See application file for complete search history.

(56) References Cited

U.S. PATENT DOCUMENTS

| | | |
|---|---|---|
| 4,186,905 A | 2/1980 | Brudy |
| 6,286,968 B1 | 9/2001 | Sailer et al. |
| 7,965,336 B2 | 6/2011 | Bingle et al. |
| 8,336,845 B1 | 12/2012 | Courbon |
| 8,544,151 B2 | 10/2013 | Courbon et al. |
| 9,449,390 B1 | 9/2016 | Ghneim |
| 9,541,190 B2 | 1/2017 | Kim et al. |
| 9,667,922 B2 | 5/2017 | Lang et al. |
| 10,166,925 B2 | 1/2019 | Wieczorek et al. |
| 10,632,923 B2 | 4/2020 | Lang et al. |
| 10,766,419 B2 | 9/2020 | Bouaziz et al. |

(Continued)

FOREIGN PATENT DOCUMENTS

| | | |
|---|---|---|
| CA | 861762 | 1/1971 |
| CN | 202088981 U | 12/2011 |

(Continued)

OTHER PUBLICATIONS

European Search Report for European Application No. 23157350.2 dated Jul. 21, 2023.

*Primary Examiner* — Minh Q Phan
(74) *Attorney, Agent, or Firm* — Carlson, Gaskey & Olds, P.C.

(57) ABSTRACT

A vehicle arm assembly includes a carrier base for attaching to a vehicle. A support arm is rotatably mounted relative to the carrier base. A first detent ring includes a plurality of first detent projections circumferentially offset by a plurality of first detent channels. A second detent ring includes a plurality of second detent projections circumferentially offset by a plurality of second detent channels. The first detent ring is fixed relative to one of the carrier base or the support arm. The second detent ring is fixed relative to the other of the carrier base or the support ring. The first detent ring is in an intermeshing arrangement when the second detent ring in a first rotational position and in a non-intermeshing arrangement when in a second rotational position. In the second rotational position a first stop surface fixed relative to the carrier base is in engagement with a stop fixed relative to the support arm.

17 Claims, 10 Drawing Sheets

(56) References Cited

U.S. PATENT DOCUMENTS

| | | |
|---|---|---|
| 10,798,275 B2 | 10/2020 | Lang et al. |
| 10,851,831 B2 | 12/2020 | Sinelli et al. |
| 11,009,065 B2 | 5/2021 | Sinelli et al. |
| 2004/0113033 A1 | 6/2004 | Johnson |
| 2004/0246608 A1 | 12/2004 | Wellington et al. |
| 2013/0128039 A1 | 5/2013 | Meier |
| 2015/0036047 A1 | 2/2015 | Bledsoe |
| 2015/0097955 A1 | 4/2015 | De Wind et al. |
| 2015/0183371 A1 | 7/2015 | Okada et al. |
| 2016/0016516 A1 | 1/2016 | Lang et al. |
| 2016/0185297 A1 | 6/2016 | Boehm |
| 2017/0026568 A1 | 1/2017 | Haehnichen |
| 2017/0101058 A1 | 4/2017 | Park |
| 2017/0136951 A1 | 5/2017 | Wieczorek et al. |
| 2019/0039531 A1 | 2/2019 | Wilson |
| 2019/0132497 A1 | 5/2019 | Lang et al. |
| 2020/0088232 A1* | 3/2020 | Sinelli .................... B60R 1/076 |

FOREIGN PATENT DOCUMENTS

| | | |
|---|---|---|
| CN | 109703462 A | 5/2019 |
| DE | 10218228 A1 | 11/2003 |
| DE | 102004039450 A1 | 3/2006 |
| DE | 102010005638 A1 | 7/2011 |
| DE | 102012003561 A1 | 8/2013 |
| DE | 102012015395 B3 | 11/2013 |
| DE | 102013217081 A1 | 3/2015 |
| DE | 102014101685 A1 | 8/2015 |
| DE | 102014006961 A1 | 11/2015 |
| DE | 202015106118 U1 | 11/2015 |
| DE | 102014111068 A1 | 2/2016 |
| DE | 102015117774 A1 | 11/2016 |
| DE | 102015122984 A1 | 5/2017 |
| DE | 102015122997 A1 | 7/2017 |
| DE | 102016102508 A1 | 8/2017 |
| DE | 102017112062 A1 | 12/2018 |
| DE | 102017125101 A1 | 5/2019 |
| DE | 102013217081 B4 | 11/2019 |
| DE | 102016102508 B4 | 3/2020 |
| DE | 102018215995 A1 | 3/2020 |
| DE | 102019219148 | 6/2020 |
| DE | 102017125101 B4 | 3/2021 |
| EP | 1111488 A2 | 6/2001 |
| EP | 2004194071 A | 7/2004 |
| EP | 1500558 A1 | 1/2005 |
| EP | 1736360 A1 | 12/2006 |
| EP | 2955065 A1 | 12/2015 |
| EP | 3178701 A1 | 6/2017 |
| EP | 3409540 A1 | 12/2018 |
| EP | 3466765 A1 | 4/2019 |
| EP | 3476654 A1 | 5/2019 |
| EP | 3178701 B1 | 6/2019 |
| EP | 2955065 B1 | 6/2020 |
| GB | 1243179 A | 8/1971 |
| JP | 06000953 U | 1/1994 |
| JP | H09175272 A | 7/1997 |
| JP | 2006113054 A | 4/2006 |
| JP | 2011003117 A | 1/2011 |
| JP | 2013241107 A | 12/2013 |
| JP | 2014151911 A | 8/2014 |
| JP | 2016113054 A | 6/2016 |
| JP | 2018531831 A | 11/2018 |
| JP | 2019108114 A | 7/2019 |
| KR | 1020190046703 A | 5/2019 |
| WO | 2000047447 A1 | 8/2000 |
| WO | 03037681 A1 | 5/2003 |
| WO | 2010028699 | 3/2010 |
| WO | 2013104420 A1 | 7/2013 |
| WO | 2015062602 A1 | 5/2015 |
| WO | 2017048126 A1 | 3/2017 |
| WO | 2017178859 A1 | 10/2017 |

* cited by examiner

COLLAPSIBLE VEHICLE CAMERA ARM ASSEMBLY

BACKGROUND

This application relates to camera mirror arm assembly, and more particularly, to a foldable camera mirror assembly for use in a commercial truck, for example.

Foldable camera mirror assemblies can be motorized or manually operated. With a motorized foldable camera mirror system, a drive motor must be located in a portion of assembly and are usually located adjacent a pivotable joint between a vehicle fixed housing and a pivotable housing. Conversely, manually operated foldable camera mirror systems do not include a drive motor and are generally pivoted by a user of the vehicle to place the assembly in a desired position.

SUMMARY

In one exemplary embodiment, a vehicle arm assembly includes a carrier base for attaching to a vehicle. A support arm is rotatably mounted relative to the carrier base. A first detent ring includes a plurality of first detent projections circumferentially offset by a plurality of first detent channels. A second detent ring includes a plurality of second detent projections circumferentially offset by a plurality of second detent channels. The first detent ring is fixed relative to one of the carrier base or the support arm. The second detent ring is fixed relative to the other of the carrier base or the support ring. The first detent ring is in an intermeshing arrangement when the second detent ring in a first rotational position and in a non-intermeshing arrangement when in a second rotational position. In the second rotational position a first stop surface fixed relative to the carrier base is in engagement with a stop fixed relative to the support arm.

In another embodiment according to any of the previous embodiments, the plurality of first projections include at least two first projections each extending a first arcuate distance around the first detent ring. A single first projections extending a second arcuate distance around the first detent ring. The second arcuate distance being greater than the first arcuate distance.

In another embodiment according to any of the previous embodiments, the single one of the plurality of first detent projection and one of the at least two first projections together extend an arcuate distance of at least 60 degrees and less than 120 degrees around the first detent ring.

In another embodiment according to any of the previous embodiments, the plurality of second detent channels includes a first set of second channels that extend for a first arcuate length. A single second channel extends a third arcuate distance and the third arcuate distance is greater than the first arcuate distance.

In another embodiment according to any of the previous embodiments, the third arcuate distance is greater than second arcuate distance.

In another embodiment according to any of the previous embodiments, the one of the at least two first projections and the single first projection are configured to intermesh with the single second channel.

In another embodiment according to any of the previous embodiments, the second single channel extends an arcuate distance of at least 60 degrees and less than 120 degrees around the second detent ring.

In another embodiment according to any of the previous embodiments, the second single channel extends an arcuate distance of at least 75 degrees and less than 105 degrees around the second detent ring.

In another embodiment according to any of the previous embodiments, the second detent ring includes a radially inner wall and a radially outer wall that creates recessed area for the plurality of second projections and the plurality of second channels.

In another embodiment according to any of the previous embodiments, each of the plurality of first channels include an axially outer surface and each of the plurality of first projections include an axially outer surface. The planar surface of each of the plurality of first channels is connected to an adjacent one of the plurality of first projections by a connecting planar surface that is transverse to the channel planar surface and the projection planar surface.

In another embodiment according to any of the previous embodiments, the first detent ring is integrally formed as a unitary piece with the one of the carrier base or the support arm. The second detent ring is integrally formed as a unitary piece with the other of the carrier base or the support arm.

In another embodiment according to any of the previous embodiments, the first detent ring is removably attached to one of the carrier base or the support arm. The second detent ring is removably attached to the other of the carrier base or the support arm.

In another embodiment according to any of the previous embodiments, at least one camera fixed relative to the support arm.

In another exemplary embodiment, a method of operating a vehicle arm assembly includes rotating a support arm including one of a first detent ring or a second detent ring relative to a carrier base having the other of the first detent ring or the second detent ring. The first detent ring is configured to intermesh with the second detent ring. Rotation of the support arm is limited relative to the carrier base in a first rotational direction with a first stop surface fixed relative to the carrier base engaging a stop fixed relative to the support arm. The first detent ring and the second detent ring are in a non-intermeshed relationship when the stop engages the first stop surface.

In another exemplary embodiment, the first detent ring includes a plurality of first channels separating a plurality of first projections. The plurality of first projections include at least two first projections each extending a first arcuate distance around the first detent ring. A single first projection extending a second arcuate distance around the first detent ring. The second arcuate distance being greater than the first arcuate distance.

In another exemplary embodiment, the single first projection, one of the first channels, and one of the at least two first projections extend an arcuate distance of at least 60 degrees and less than 120 degrees around the first detent ring.

In another exemplary embodiment, the second detent ring includes a plurality of second detent channels have a first set of second detent channels that extend for the first arcuate distance. A single second detent channel extends a third arcuate distance and the third arcuate distance is greater than the first arcuate distance.

In another exemplary embodiment, the single second detent channel extends an arcuate distance of at least 60 degrees and less than 120 degrees around the second detent ring.

In another exemplary embodiment, the single second detent channel extends an arcuate distance of at least 75 degrees and less than 105 degrees around the second detent ring.

In one exemplary embodiment, limiting rotation of the support arm relative to the carrier base in a second rotational direction with a second stop surface fixed relative to the carrier base engaging the stop fixed relative to the support arm. The first detent ring and the second detent ring are in a non-intermeshing relationship when the stop engages the second stop surface.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
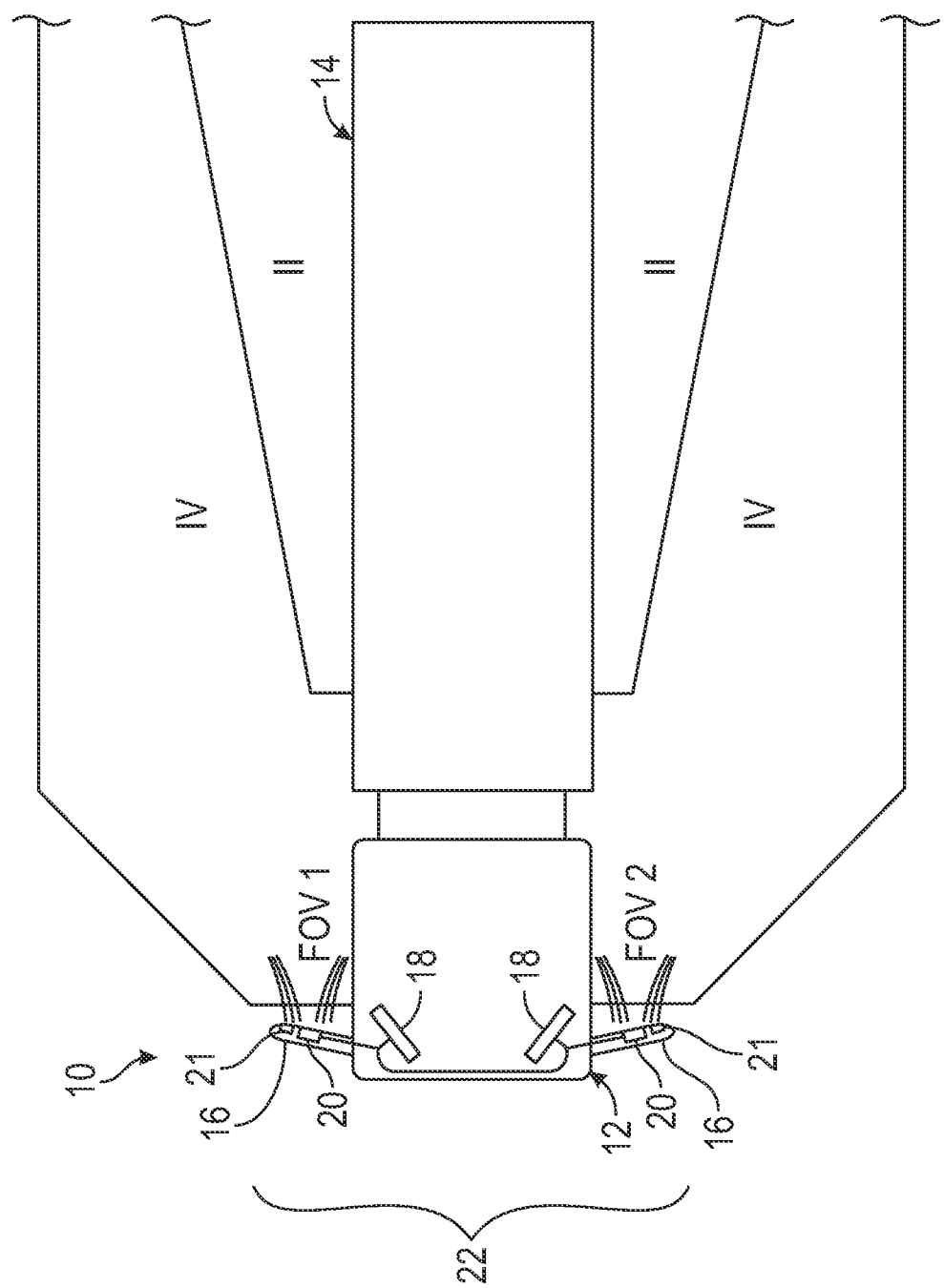
FIG. 1 is a schematic top elevation view of a commercial truck with a camera mirror system (CMS) providing Class II and Class IV views.

A schematic view of a commercial vehicle 10 is illustrated in FIG. 1. The vehicle 10 includes a vehicle cab 12 for towing a trailer 14. Driver and passenger side arm assemblies 16 are mounted to the vehicle cab 12, such as a camera arm assembly. If desired, the arm assemblies 16 may include conventional mirrors integrated with them as well. First and second displays 18 are arranged on each of the driver and passenger sides within the vehicle cab 12 near the A-pillars to display Class II and Class IV views on each side of the vehicle 10.

A rearward facing camera 20 is arranged within each arm assembly 16. The cameras 20 provide a field of view FOV1, FOV2 that includes at least one of the Class II and Class IV views. Multiple cameras also may be used on each arm assembly 16, if desired. The system 10 may provide one or more cameras directed at the Class V and Class VI views instead or additionally.

Figure 2:
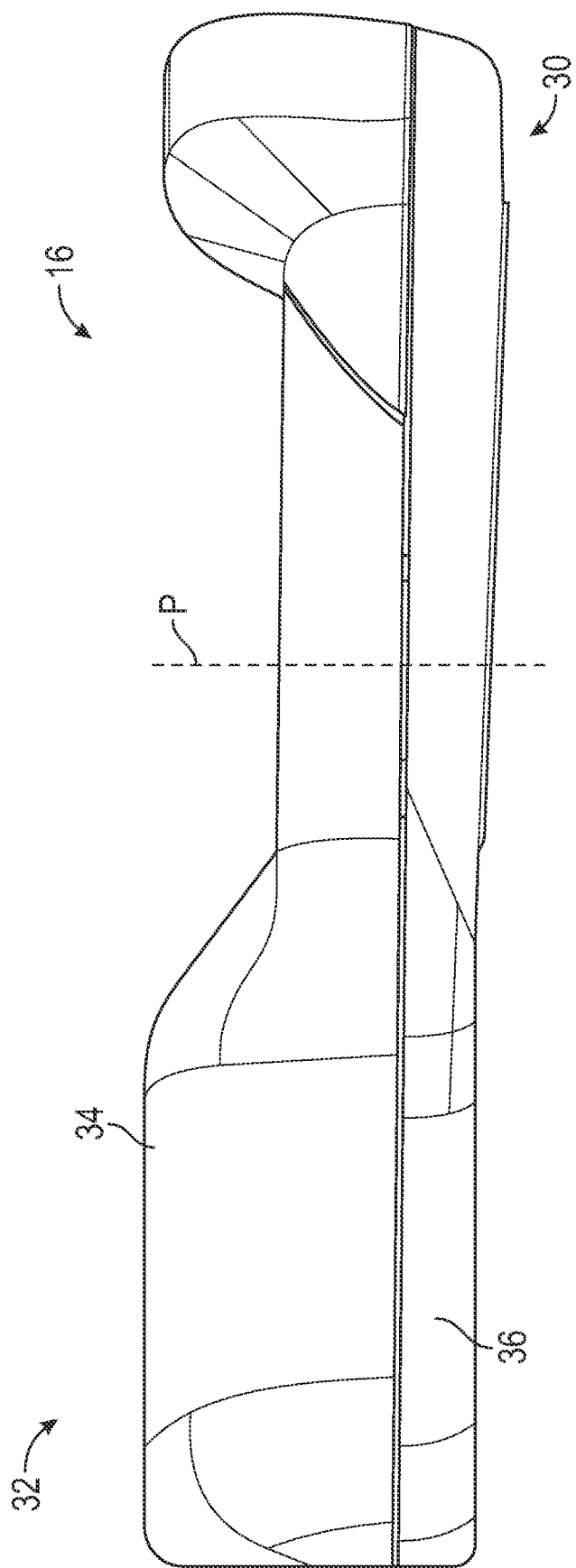
FIG. 2 is a perspective view of an arm assembly.

As shown in FIG. 2, the arm assembly 16 includes a contoured profile that contributes to a reduction in aerodynamic drag on the vehicle 10 during operation. The arm assembly 16 includes a carrier base 30 for attaching to the vehicle cab 12 and a pivoting portion 32 that pivots relative to the carrier base 30. The pivoting portion 32 supports at least one of the rearward facing camera 20 or a conventional mirror 21 adjacent a distal end of the arm assembly 16. Alternatively, the arm assembly 16 could be used with only the mirror 21 and not the camera 20.

Figure 3:
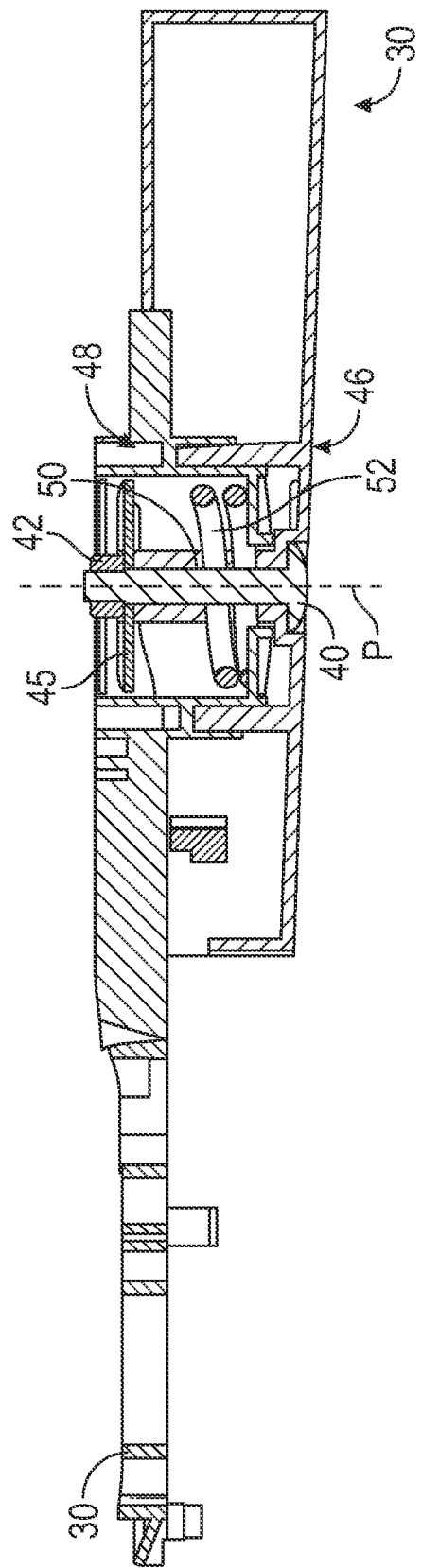
FIG. 3 is a cross-section view of the camera arm assembly of FIG. 2 without fairings.
Figure 5:
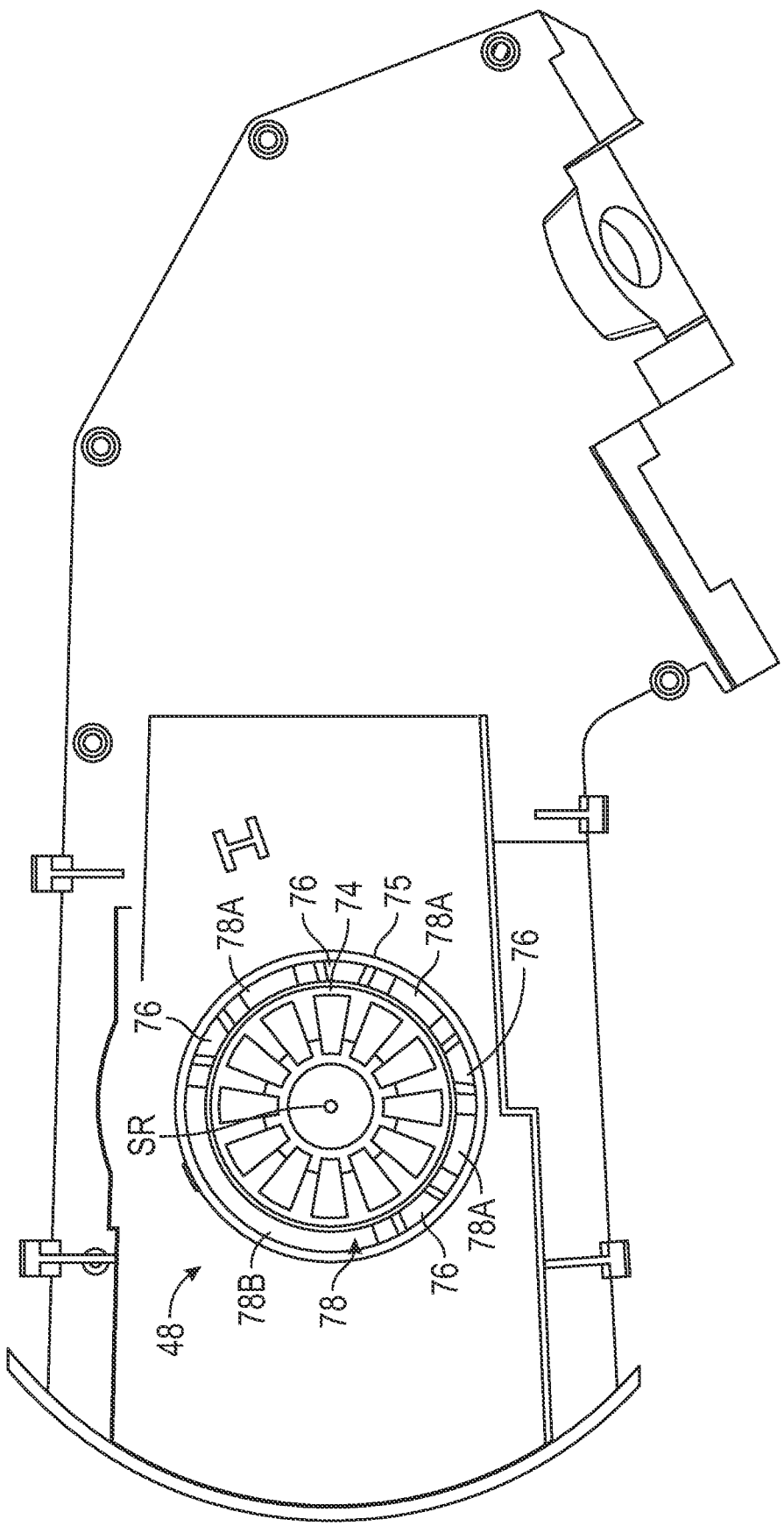
FIG. 5 is a bottom view of a support arm of the camera arm assembly of FIG. 2.

The pivoting portion 32 also includes an upper fairing 34 and a lower fairing 36 that enclose a support arm 38 (FIGS. 2-3 and 5). The support arm 38 forms a pivotable connection with the carrier base 30 as will be described in greater detail below. Because the arm assembly 16 is manually pivoted between a retracted (FIG. 8A) and extended position (FIG. 7A), it does not include a motor to pivot the pivoting portion 32 relative to the carrier base 30. Additionally, the arm assembly 16 in the vicinity of the connection between the pivoting portion 32 and the carrier base 30 (See FIGS. 2 and 3) includes a smaller vertical dimension and therefore includes a smaller leading edge area. This reduces drag on the arm assembly 16 and improves fuel efficiency of the vehicle 10. In the illustrated example, a vertical height of the arm assembly 16 in the vicinity of the pivot axis P is between 50 mm and 70 mm (1.97 inches and 2.76 inches).

As shown in FIG. 3, a support detent ring 48 on the support arm 38 engages a carrier detent ring 46 on the carrier base 30 to allow the support arm 38 in the pivoting portion 32 to be selectively rotated relative to the carrier base 30 into one of a multiple predetermined positions. The carrier detent ring 46 and the support detent ring 48 are biased toward each other with a spring 52, such as a helical spring, to encourage the carrier detent ring 46 to move into an intermeshing position with the support detent ring 48.

To provide the biasing force, the spring 52 engages a retainer disk 45 fixed relative to the carrier base 30 on a first axial end and the support arm 38 on an opposite second axial end. The retainer disk 45 is secured relative to the carrier base 30 with a fastener 40 having a head engaging the carrier base 30 and a shaft extending through a passage on a central shaft 50. The central shaft 50 extends from the carrier base 30. A distal end of the fastener 40 is threaded and located outside of the passage on the central shaft 50. The retainer disk 45 includes a central opening for accepting the fastener 40 and a nut 42 engages the threaded distal end of the fastener 40 and the retainer disk 45 to secure the retainer disk 45 relative to the carrier base 30.

Figure 6A:
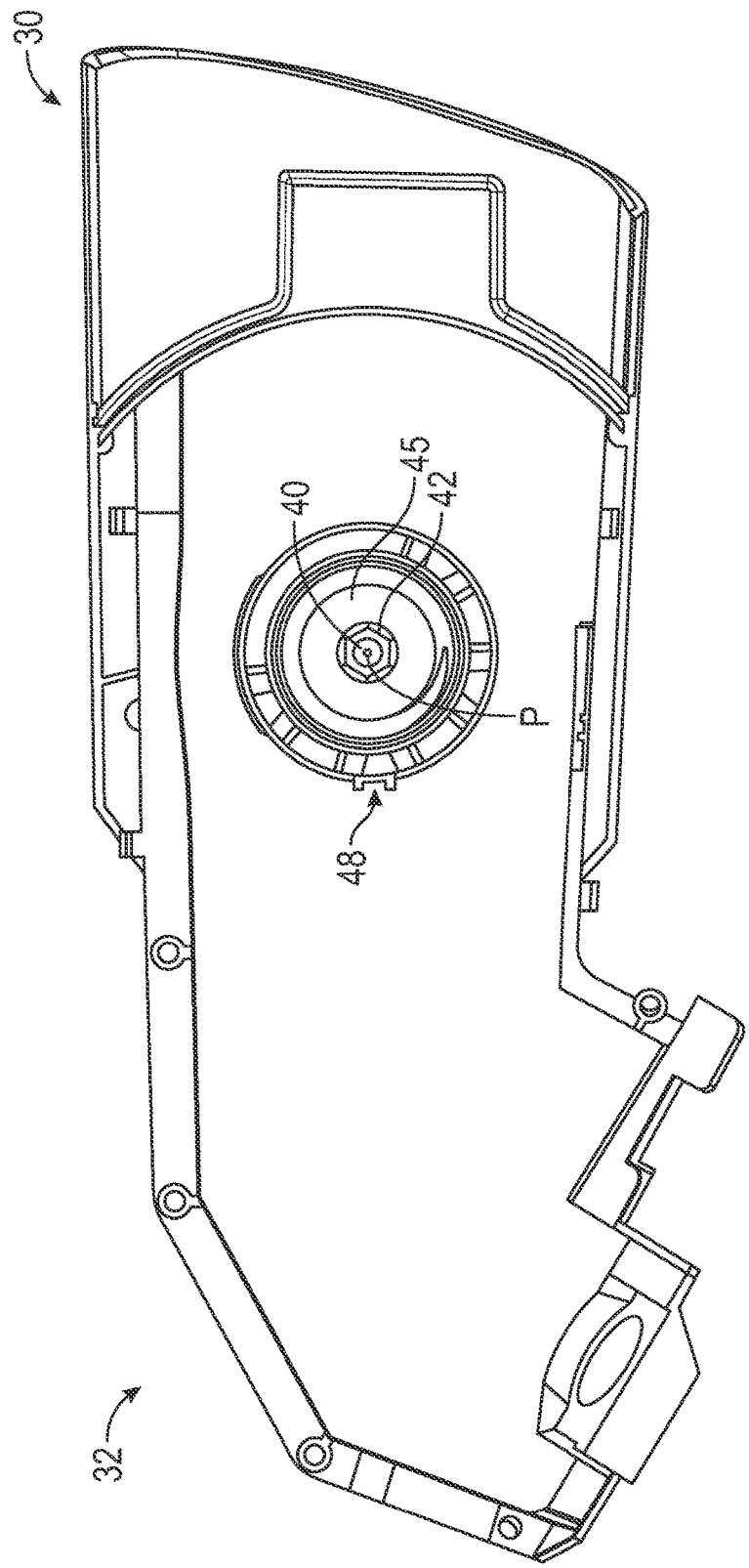
FIG. 6A is a top view of the support arm of FIG. 5 mounted for rotation about the carrier base of FIG. 4.
Figure 7A:
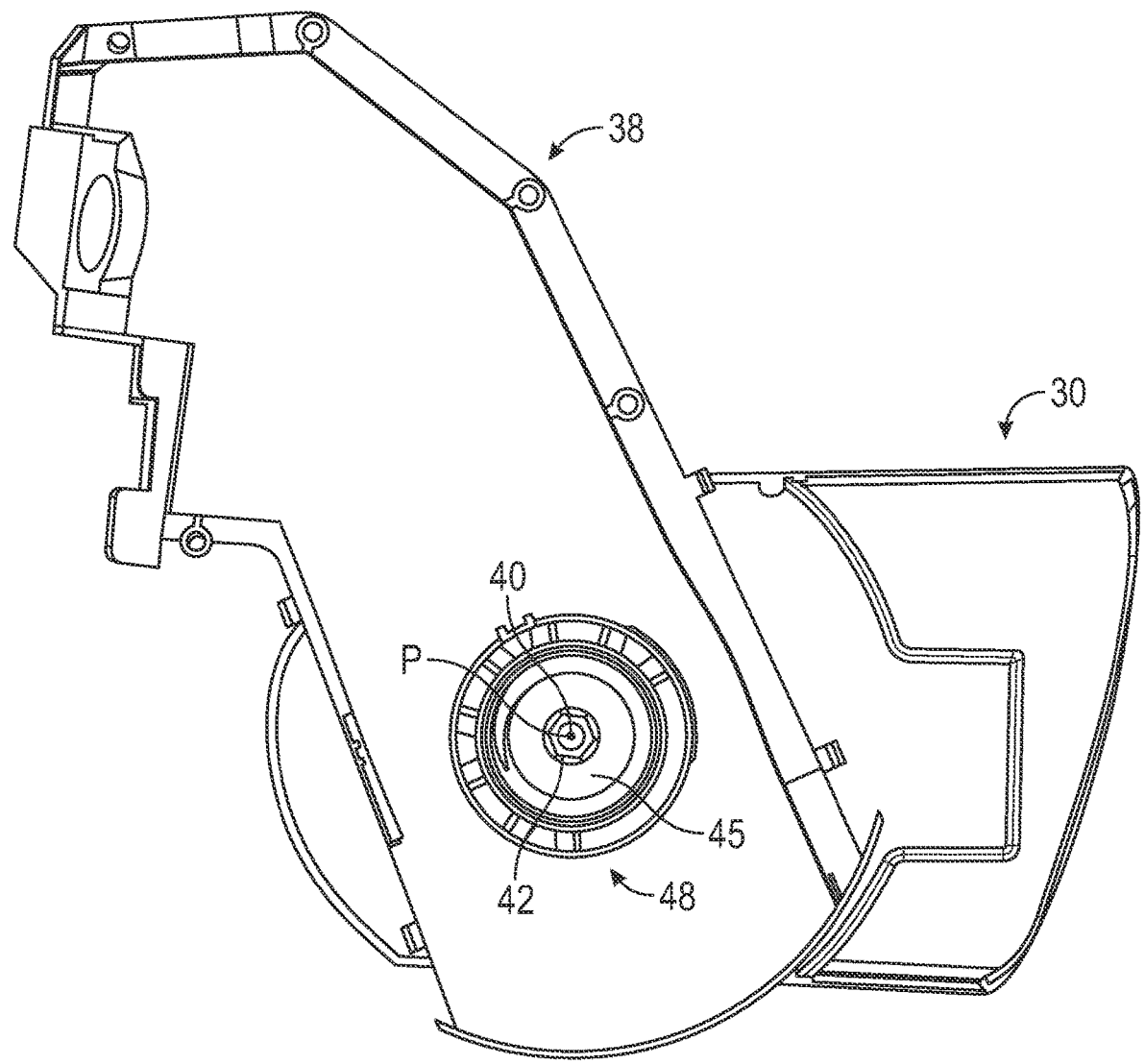
FIG. 7A illustrates the support arm in an extended position relative to carrier base.
Figure 8A:
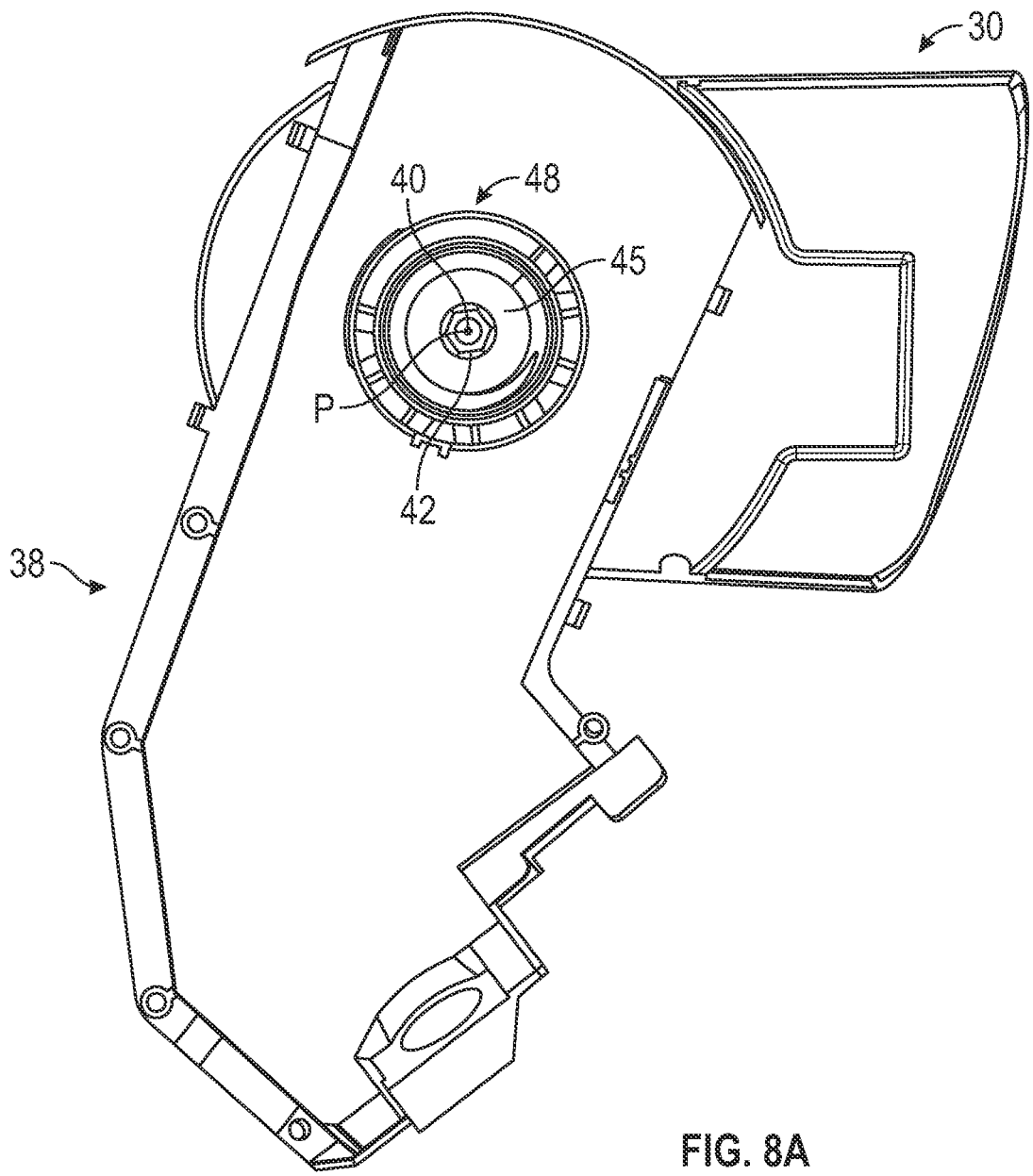
FIG. 8A illustrates the support arm in a retracted position relative to the carrier base.

As shown in FIGS. 6A, 7A, and 8A, the support arm 38 is allowed to selectively pivot or rotate relative to the carrier base 30 through the intermeshing of carrier detent ring 46 and the support detent ring 48. The force generated by the spring 52 provides a biasing force to move the carrier detent ring 46 into the intermeshing arrangement with the support detent ring 48. However, this force is overcome by pivoting the support arm 38 which compresses the spring 52.

Figure 4:
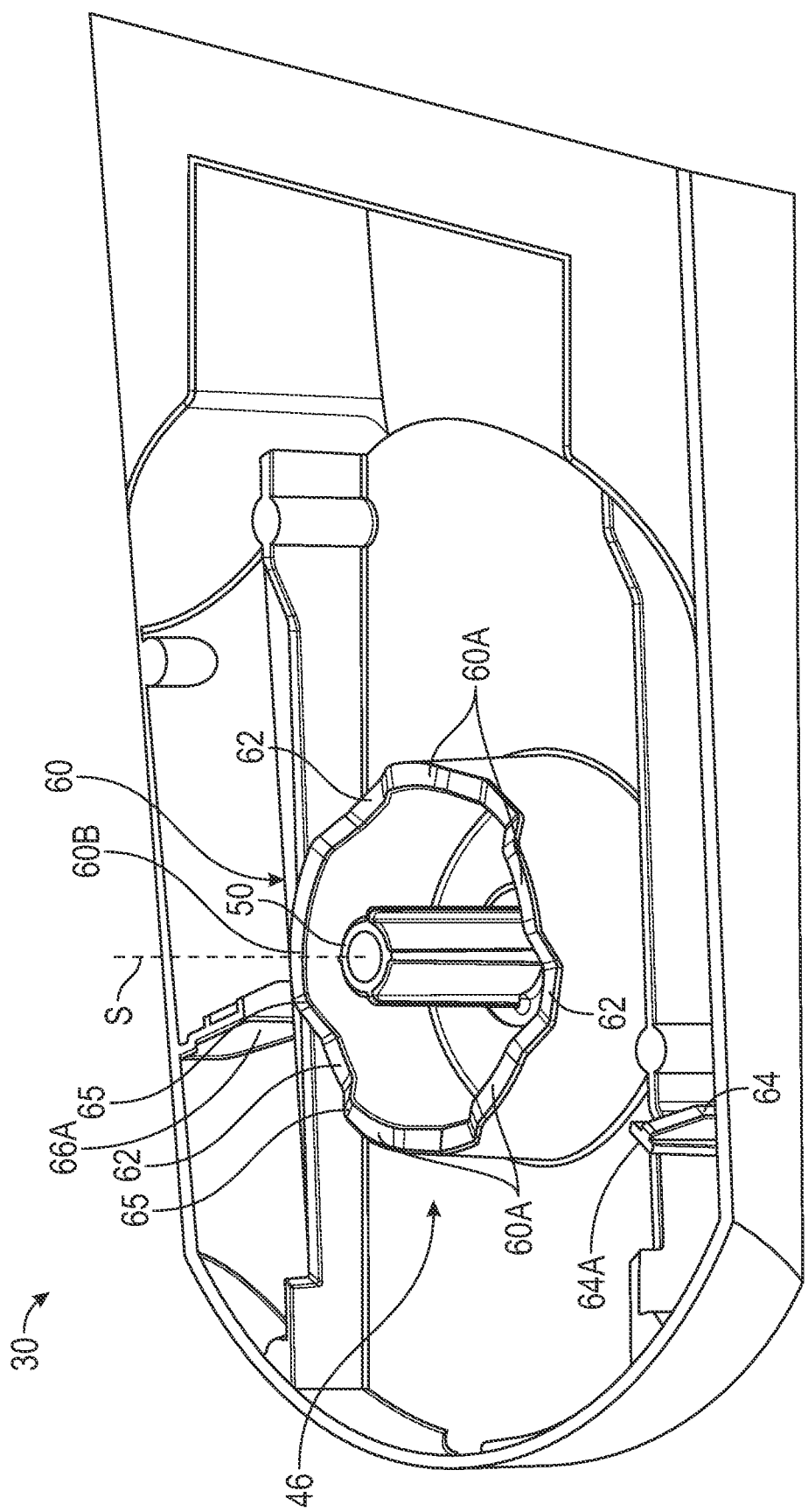
FIG. 4 is a perspective view of a carrier base of the arm assembly of FIG. 2.

In the illustrated example of FIG. 4, the carrier detent ring 46 includes a ring formed by a cylindrical wall that extends from a body portion of the carrier base 30. The carrier detent ring 46 can be integrally formed with the carrier base 30 or the carrier detent ring 46 can be removably attached to the carrier base 30. A distal end of the carrier detent ring 46 includes a plurality of projections 60 that are circumferentially spaced or offset from adjacent projections 60 by a corresponding one of a plurality of channels 62. Therefore, the projections 60 are located at a distal end of the cylindrical wall at a greater distance from the carrier base 30 than the channels 62.

The projections 60 include a first set of projections 60A extending a first arcuate distance relative to a central longitudinal axis S of the central shaft 50 and a second single projection 60B that extends a second arcuate distance relative to the axis S. Also, each of the channels 62 separating the projections 60A extend for a common or singular arcuate distance relative to the axis S. Additionally, the second singular projection 60B extends for an arcuate distance of between 40 and 60 degrees around the carrier detent ring 46 relative to the axis S. Furthermore, the cylindrical wall including the projections 60 and the channels 62 are spaced from the central shaft 50 to accommodate the spring 52. In this disclosure, arcuate distances have a single or common radial distance relative to an axis unless stated otherwise.

In the illustrated example, each of the five projections 60 include a projection surface defining an axially outer surface of the projection 60 and each of the five channels 62 include a channel surface defining an axially outer surface of the channel 62. In the illustrated example, the projection surfaces and the channel surfaces are planar. However, they projection surfaces and the channel surfaces could be curved with a varying distance from the body portion of the carrier base 30. The above arcuate distance for the single projection 60B in degrees are in relation to the axially outer surface of the single projection 60B.

Adjacent projection surfaces of the projections 60 and channel surfaces of the channels 62 are connected by one of a plurality of transition surfaces 65. The transition surfaces 65 are transverse to both the projection surfaces and the channel surfaces not perpendicular to either one. This facilitates rotational movement of the carrier detent ring 46 with the support detent ring 48 when pivoting the support arm 38 relative to the carrier base 30 because the transition surfaces 65 operate as ramps.

As shown in FIGS. 3 and 5, the support detent ring 48 extends from a bottom side of the support arm 38. The support detent ring 48 faces towards the carrier detent ring 46 when assembled. The support arm 38 includes a proximal end having a curvature to facilitate pivoting relative to the carrier base 30 and a distal end for securing a camera 20 or mirror 21. In the illustrated example, the support detent ring 48 is integrally formed with the support arm 38. However, in another example, the support detent ring 48 is removably attached to the support arm 38.

In the illustrated example, the support detent ring 48 includes radially inner and outer cylindrical walls 74, 75 relative to an axis SR of a central opening in the support detent ring 48. The axis SR is colinear with the axis P and the axis S. In the illustrated example, the radially inner and outer walls 74, 75 at least partially surround a series of projections 76 and channels 78 located in a recessed area between the radially inner and outer walls 74, 75. One feature of the radially inner and outer walls 74, 75 is to improve alignment between the support detent ring 48 and the carrier detent ring 46.

Each of the four projections 76 include a projection surface defining an axially outer most surface of the projection 76 and each of the four channels 78 include an axially outer most surface of the channel 78. Adjacent axially outer most surfaces of the projections 76 and channels 78 are connected by a transition surface 80. The transition surfaces 80 are transverse to both the outer surfaces of the projections 76 and the channels 78 and the projections 76 and not perpendicular.

In the illustrated example, a first set of channels 78A of the channels 78 extend for a common or singular first arcuate distance relative the axis SR of the support detent ring 48. A second channel 78B of the channels 78 extends for a second arcuate distance about the axis SR with the second arcuate distance extending between 60 and 120 degrees around the axis SR. In another example, the second arcuate distance extends between 75 and 105 degrees around the support detent ring 48. In the above example, the above arcuate distances in degrees correspond to the axially outer most surface of the second channel 78B.

Figure 6B:
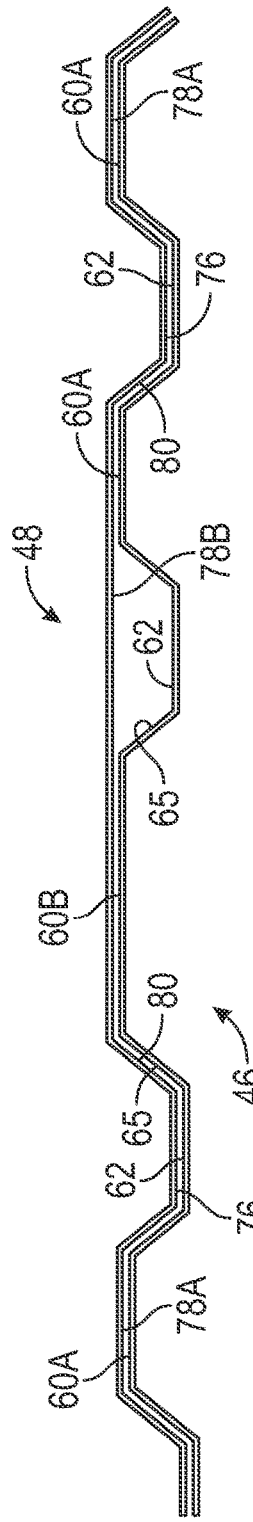
FIG. 6B illustrates a plan view of a support detent on the support arm in engagement with a carrier detent on the carrier base with the support arm and the carrier base in the position shown in FIG. 6A.

Furthermore, when the support arm 38 is in a normal operating position relative to the carrier base 30 as shown in FIG. 6A, the second singular projection 60B and one of the projections 60A are located in the second channel 78B as shown in FIG. 6B. The projection 60B located in the channel 78B is immediately adjacent one of the projections 76.

Figure 7B:
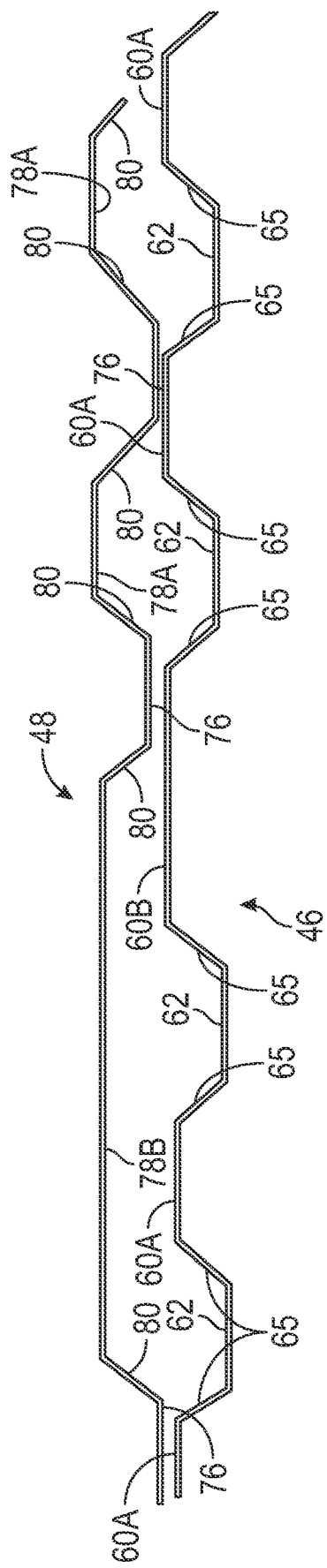
FIG. 7B illustrates a plan view of the support detent on the support arm in engagement with the carrier detent on the carrier base with the support arm and the carrier base in the position shown in FIG. 7A.

When the support arm 38 is pivoted about the carrier base 30 in an upstream direction or towards a leading edge of the assembly 16 as shown in FIG. 7A, the projection 60B will engage the outer surface of at least one of the projections 76 on the carrier base. This prevents the carrier detent ring 46 from intermeshing with the support detent ring 48 because the projection 60B includes a larger circumferential distance than the channels 78A as shown in FIG. 7B.

Figure 8B:
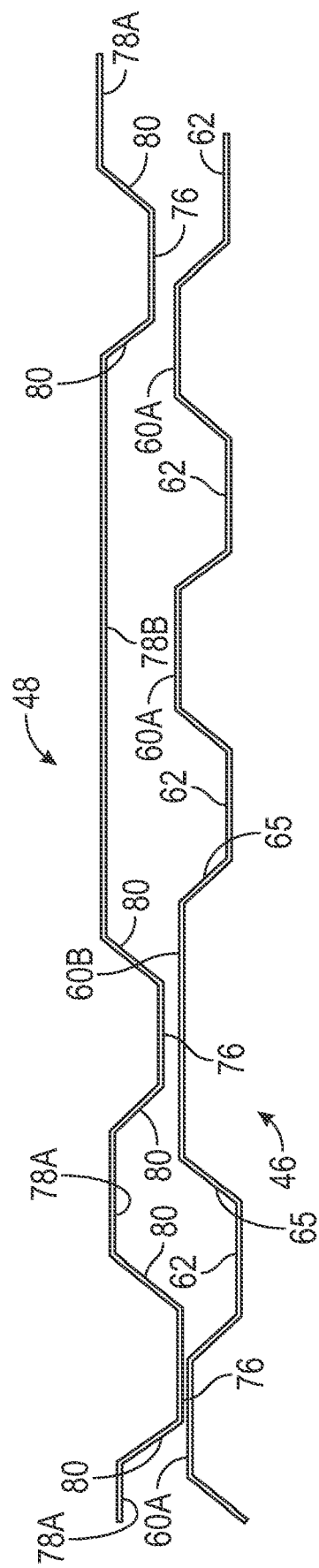
FIG. 8B illustrates a plan view of the support detent on the support arm in engagement with the carrier detent on the carrier base with the support arm and the carrier base in the position shown in FIG. 8A.

When the support arm 38 is pivoted about the carrier base 30 in a downstream direction as shown in FIG. 8A, the projection 60B will engage the outer surface of at least one of the projections 76 on the carrier base 30. This prevents the carrier detent ring 46 from intermeshing with the support detent ring 48 because the projection 60B includes a larger circumferential distance than the channels 78A as shown in FIG. 8B.

As shown in FIG. 4, a first stop 64 and a second stop 66 are located radially outward from the carrier detent ring 46 relative to axis S on the carrier base 30. In the illustrated example, a stop surface 64A, 66A on the first and second projections 64, 66, respectively, are located in a radially overlapping position relative to the axis SR. A stop projection 68 is located on the support arm 38 and positioned to contact the stop surfaces 64A when the support arm 38 is rotated as shown in FIG. 8A and the stop surface 66B when the support arm 38 is rotated as shown in FIG. 7A. The interaction between the first and second projections 64, 66 and the stop projection 68 prevents over rotation of the support arm 38 relative to the carrier base 30. The first and second stop projections 64, 66 and the stop projection 68 are also positioned to prevent intermeshing of the carrier detent ring 46 with the support detent ring 48.

Additionally, the first and second projections 64, 66 and the stop projection 68 are positioned such that when the stop projection 68 engages either of the first or second projections 64, 66, the carrier detent ring 46 and the support detent ring 48 are not in an intermeshing position. In particular, the outer surface of the projections 60 on the carrier detent ring 46 and the outer surfaces of the projections 76 on the support detent ring 48 are in engagement with each other. One feature of this configuration is that when the support arm 38 is fully extended and at a greatest distance for the operator of the vehicle to reach, the support arm 38 is not restricted by the force needed to move the carrier detent ring 46 and the support detent ring 48 out of an intermeshing engagement. In particular, the force needed to move the support arm 38 will mostly be from the frictional forces between the outer surfaces on the projections 60, 78.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A vehicle arm assembly comprising:
a carrier base for attaching to a vehicle;
support arm rotatably mounted relative to the carrier base;
a first detent ring including a plurality of first detent projections circumferentially offset by a plurality of first detent channels; and
a second detent ring including a plurality of second detent projections circumferentially offset by a plurality of second detent channels;
wherein the first detent ring is fixed relative to one of the carrier base or the support arm and the second detent ring is fixed relative to the other of the carrier base or the support ring;
wherein the first detent ring is in an intermeshing arrangement when the second detent ring in a first rotational position and in a non-intermeshing arrangement when in a second rotational position;
wherein in the second rotational position a first stop surface fixed relative to the carrier base is in engagement with a stop fixed relative to the support arm;
wherein the plurality of first detent projections include at least two first projections each extending a first arcuate distance around the first detent ring and a single first projection extending a second arcuate distance around the first detent ring with the second arcuate distance being greater than the first arcuate distance; and
wherein the single one of the plurality of first detent projections and one of the at least two first projections together extend an arcuate distance of at least 60 degrees and less than 120 degrees around the first detent ring.

2. The assembly of claim 1, wherein the plurality of second detent channels includes a first set of second channels extending for the first arcuate distance and a single second channel extending a third arcuate distance and the third arcuate distance is greater than the first arcuate distance.

3. The assembly of claim 2, wherein the third arcuate distance is greater than second arcuate distance.

4. The assembly of claim 2, wherein the one of the at least two first projections and the single first projection are configured to intermesh with the single second channel.

5. The assembly of claim 2, wherein the second single channel extends an arcuate distance of at least 60 degrees and less than 120 degrees around the second detent ring.

6. The assembly of claim 2, wherein the second single channel extends an arcuate distance of at least 75 degrees and less than 105 degrees around the second detent ring.

7. The assembly of claim 2, wherein the second detent ring includes a radially inner wall and a radially outer wall that creates recessed area for the plurality of second projections and the plurality of second channels.

8. The assembly of claim 1, wherein each of the plurality of first detent channels include an axially outer surface that is planar, each of the plurality of first detent projections include an axially outer surface that is planar, and each of the plurality of first detent channels is connected to an adjacent one of the plurality of first detent projections by a connecting planar surface that is transverse to its first detent channels planar outer surface and its first detent projections planar outer surface.

9. The assembly of claim 1, wherein the first detent ring is integrally formed as a unitary piece with the one of the carrier base or the support arm and the second detent ring is integrally formed as a unitary piece with the other of the carrier base or the support arm.

10. The assembly of claim 1, wherein the first detent ring is removably attached to one of the carrier base or the support arm and the second detent ring is removably attached to the other of the carrier base or the support arm.

11. The assembly of claim 1, further comprising at least one camera fixed relative to the support arm.

12. A vehicle arm assembly comprising:
a carrier base for attaching to a vehicle;
support arm rotatably mounted relative to the carrier base;
a first detent ring including a plurality of first detent projections circumferentially offset by a plurality of first detent channels; and
a second detent ring including a plurality of second detent projections circumferentially offset by a plurality of second detent channels;
wherein the first detent ring is fixed relative to one of the carrier base or the support arm and the second detent ring is fixed relative to the other of the carrier base or the support ring;
wherein the first detent ring is in an intermeshing arrangement when the second detent ring in a first rotational position and in a non-intermeshing arrangement when in a second rotational position; and
wherein in the second rotational position a first stop surface fixed relative to the carrier base is in engagement with a stop fixed relative to the support arm, wherein the plurality of first detent projections include at least two first projections each extending a first arcuate distance around the first detent ring, and only one of the plurality of first detent projections extends a second arcuate distance around the first detent ring with the second arcuate distance being greater than the first arcuate distance.

13. A method of operating a vehicle arm assembly, comprising:
rotating a support arm including one of a first detent ring or a second detent ring relative to a carrier base having the other of the first detent ring or the second detent ring, wherein the first detent ring is configured to intermesh with the second detent ring;
limiting rotation of the support arm relative to the carrier base in a first rotational direction with a first stop surface fixed relative to the carrier base engaging a stop fixed relative to the support arm, wherein the first detent ring and the second detent ring are in a non-intermeshed relationship when the stop engages the first stop surface;
wherein the first detent ring includes a plurality of first channels separating a plurality of first projections, and the plurality of first projections include at least two first projections each extending a first arcuate distance around the first detent ring and a single first projection extending a second arcuate distance around the first detent ring with the second arcuate distance being greater than the first arcuate distance; and wherein the single first projection, one of the first channels, and one of the at least two first projections extend an arcuate distance of at least 60 degrees and less than 120 degrees around the first detent ring.

14. The method of claim 13, wherein the second detent ring includes a plurality of second detent channels having a first set of second detent channels extending for the first arcuate distance and a single second detent channel extending a third arcuate distance and the third arcuate distance is greater than the first arcuate distance.

15. The method of claim 14, wherein the single second detent channel extends an arcuate distance of at least 60 degrees and less than 120 degrees around the second detent ring.

16. The method of claim 14, wherein the single second detent channel extends an arcuate distance of at least 75 degrees and less than 105 degrees around the second detent ring.

17. The method of claim 13, further comprising:
limiting rotation of the support arm relative to the carrier base in a second rotational direction with a second stop surface fixed relative to the carrier base engaging the stop fixed relative to the support arm, wherein the first detent ring and the second detent ring are in a non-intermeshing relationship when the stop engages the second stop surface.

* * * * *